(12) United States Patent
Aarebrot et al.

(10) Patent No.: US 6,875,358 B2
(45) Date of Patent: Apr. 5, 2005

(54) WATER CLEANING PROCESS

(75) Inventors: Eivind Aarebrot, Hommersåk (NO); Trygve Håland, Tananger (NO)

(73) Assignee: Den Norske Stats Oljeselskap A.S., Stavanger (NO)

( * ) Notice: Subject to any disclaimer, the term of this patent is extended or adjusted under 35 U.S.C. 154(b) by 162 days.

(21) Appl. No.: 10/203,095

(22) PCT Filed: Feb. 6, 2001

(86) PCT No.: PCT/NO01/00041

§ 371 (c)(1),
(2), (4) Date: Oct. 28, 2002

(87) PCT Pub. No.: WO01/58813

PCT Pub. Date: Aug. 16, 2001

(65) Prior Publication Data

US 2003/0127387 A1 Jul. 10, 2003

(30) Foreign Application Priority Data

Feb. 8, 2000 (NO) .......................................... 20000617

(51) Int. Cl.⁷ .............................................. B01D 11/00
(52) U.S. Cl. .................... 210/634; 166/267; 166/305.1; 210/149; 210/170; 210/175; 210/259; 210/512.1; 210/747; 210/749; 210/774; 210/806
(58) Field of Search ................................ 210/149, 170, 210/175, 182, 259, 511, 512.1, 512, 702, 708, 742, 747, 774, 787, 788, 799, 805, 806, 180, 188, 258, 634, 195.1, DIG. 5; 166/267, 305.1; 208/311, 318

(56) References Cited

U.S. PATENT DOCUMENTS

| | | | | |
|---|---|---|---|---|
| 2,109,157 A | * | 2/1938 | Tijmstra ................. 208/208 R |
| 4,340,076 A | * | 7/1982 | Weitzen ........................ 137/13 |
| 4,401,570 A | | 8/1983 | Blytas et al. |
| 4,874,528 A | * | 10/1989 | Foreman et al. ............ 210/705 |
| 5,093,006 A | * | 3/1992 | Kalnins ....................... 210/704 |
| 5,236,590 A | * | 8/1993 | Sciamanna et al. ......... 210/639 |
| 5,302,294 A | * | 4/1994 | Schubert et al. ............ 210/702 |

FOREIGN PATENT DOCUMENTS

| | | |
|---|---|---|
| EP | 0 586 107 A1 | 3/1994 |
| GB | 2 046 237 A | 11/1980 |
| JP | 58-131104 A | 8/1983 |
| NO | 305346 B1 | 5/1999 |
| RU | 2 022 609 C1 | 11/1994 |
| WO | WO 98/37941 A1 | 9/1998 |

* cited by examiner

*Primary Examiner*—Joseph Drodge
(74) *Attorney, Agent, or Firm*—Foley & Lardner LLP

(57) ABSTRACT

Method and system for extraction of fat or oil-soluble components, e.g. PAH, NDP and/or BTX, from produced water being separated from an oil or gas plant. The method is characterized by injection of a liquid consisting of hydrocarbons from the oil or gas plant into the water flow, the injection liquid having a lower content of the oil soluble components than the original oil phase in equilibrium with the water, the injection liquid is atomized into the whole water phase and the water/hydrocarbon mixture is given a predetermined retention time thus to allow mass transferring of the oil soluble components from the water to the injection liquid, before the injection liquid is separated from the water in a separator, preferably a hydro cyclone, the injection liquid being adapted to the separators working range for pressure and temperature.

21 Claims, 2 Drawing Sheets

FIG.1

WATER CLEANING PROCESS

CROSS REFERENCE TO RELATED APPLICATIONS

This application is a 371 application of the PCT publication No. WO 01/58813 A1 published in English on Aug. 16, 2001 and filed on Feb. 6, 2001 as International Patent Application No. PCT/NO01/00041. This application claims priority to Norwegian Patent Application No. 20000617 filed Feb. 8, 2000. The content of the above-mentioned documents is hereby incorporated by reference.

BACKGROUND OF THE INVENTION

1. Field of the Invention

The invention relates to an improved method for purifying water containing dissolved hydrocarbons and chemicals. The improvement implies that some of the most environment hostile, dissolvable components also can be separated. This may be achieved by minor modifications of the existing purification equipment, by using a condensate flow from the production system as extraction medium.

2. Description of the Related Art

There is a demand for cleaning processes which removes dissolved aromatics from produced water. Spillage to water has attracted increased attention, and new environmental requirements introduced may result in requirement for reinjection of produced water, if the methods for cleaning are not improved. For older oil fields with increasing water production, such requirements may ultimately result in close down. One single platform at the Statfjord field produces to-day 32,000 $m^3$/d produced water.

Hydrocyclones are used for purifying water in a production plant for oil and gas. This technology meets the present cleaning requirements of 40 ppm for free oil in water, most often within good margins. Harmful effects of serious degree on the environment occur rarely at such low concentrations of spillage.

Hydrocyclones do not remove dissolved hydrocarbons from the water. Produced water contains also dissolved components, including aromatics such as benzene, toluene and xylene (BTX), naphthalene, phenantrene (NPD), and polyaromatic hydrocarbons (PAH). Such compounds are destroyed slowly, and accumulates in the food chain. Certain chemicals employed in oil production may have corresponding properties.

International Patent Application No. PCT/NO97/00060 discloses a system for removal of water soluble hydrocarbons in a water flow. This process is based on injection and fine dispersion of natural gas in a water flow at pressure and temperature conditions permitting the gas to function as solvent for hydrocarbons dissolved in the water. The dispersed gas bubbles expand when absorbing the water solvent hydrocarbons and achieve a reduced density compared to the water, which makes them easy to be remove, for example by applying hydrocyclones. This method will, however, not be sufficiently effective in practice.

The above referenced International Application No. PCT/NO97/00060 claims to relate to a method for extraction of dissolved and dispersed hydrocarbons from water. Extraction of dissolved hydrocarbons is mentioned, but the technical description does not cover the conditions which are necessary to achieve this effect.

In reality this publication discloses only unit operations for removal of dispersed oil from water, and is not, as such, suitable to solve the same problem as the present invention: The description of separation is focused on drops of dispersed oil, with emphasis on the fact that reduced density and increased size of the oil drops increase the degree of separation.

That the use of "liquefied natural gas" in claim 1 has a function in preference of other hydrocarbons in fluid form, and is linked to low density of such.

Extraction of aromatics from the water phase is primarily mentioned in the description as an additional effect. Neither the patent claims nor the description disclose the required conditions to be met, such as area of contact, time of retention or concentrations of the aromatics.

The conditions which are described as necessary in order to increase separation of dispersed oil, is neither sufficient nor necessary in order to provide separation of dissolved components. The general statement that liquefied hydrocarbons may be used for extraction of liquefied compounds in water, may be considered as known, even if the hydrocarbon phase is "liquefied natural gas".

Application of "liquified natural gas" implies a negative effect on existing hydrocyclone systems, the applicant specifying that "Hydrocyclones operates at pressure and temperature such that the gas is in a liquefied form at the cyclones overflow". It is well known within the industry that cooling and changes in pressure require equipment which may result in heavy deterioration of the purifying process for produced water. Hence, it is not a very desirably solution to change the pressure and temperature of the fluids to be separated.

PCT/NO97/00060 describes in principle application of "liquefied natural gas" for improving separation of dispersed oil in hydrocyclone based systems. A major feature in the Patent Specification is that increase of differences in density between the oil phase and the water phase is credited as providing a major effect. The Patent Specification does also specify that dissolved components are removed during the process, but the specification lacks a description on how this may be achieved.

SUMMARY OF THE INVENTION

The present invention relates to a process for removal of dissolved components from produced water in hydrocyclone based systems, and where a suitable extraction fluid may be chosen/produced for the purpose. Emphasis is made with respect to the requirements which must be met in order to make the separation of the dissolved components function. A surprising and cost saving element is that extraction fluid may be produced from a condensate phase in the very same production plant, from which the water is produced.

Even though both solutions as such relates to improved cleaning of produced water in hydrocyclone based systems, they relates to different solutions having substantial environmental importance, as most of the existing hydrocyclone based systems will function satisfactory.

Hence, the present invention relates to an improved method and a system for extraction of fat or oil soluble components, for example PAH, NPD, and/or BTX, from produced water which is separated from an oil and/or gas plant, and where the method is characterised by injection of a liquid comprising hydrocarbons from an oil and/or gas plant in a water flow, said injection liquid having a lower content of the oil dissolved components than original oil phase in equilibrium with the water, where the injection liquid is finely dispersed in the entire water phase and mixture of water/hydrocarbon is given a predetermined retention, thereby allowing mass transfer of the oil soluble components from the water to the injection liquid, where after the injection liquid is separated from the water in a separator, preferably a hydrocyclone, where the injection liquid is adapted to the working range of the separator both with respect to pressure and temperature.

Correspondingly, the present invention relates to a system as described above, characterised in that it comprises means for injecting and distributing a liquid in the water, said liquid consisting of hydrocarbons which are separated out in the oil/gas treatment process of the plant and having a lower content of the oil soluble components than the equilibrium concentration against the water, means for giving the hydrocarbon/water mixture a predetermined time of retention parallel with the liquid being held dispersed in the mixture, and a separator for separation of hydrocarbons from the water subsequent to the period of retention.

According to a preferred embodiment, the invention comprises production of an extraction medium directly from the same plant as the water. Production of an extraction medium to a suitable composition, pressure and temperature, will otherwise represent a substantial cost or represent a direct limitation. In a production plant for oil and gas, condensate fractions which will be suitable for extraction of dissolved aromatics in water, may be extracted. It is demonstrated in experiments that extraction of dissolved aromatics will occur.

The present invention relates thus to an improved method for purifying water containing dissolved hydrocarbons and chemicals. In addition to the separation, the following improvements having substantial impact on costs related to such processes, exist:

It is possible to use an extraction fluid taken directly out from the production plant producing the water. There is no need for performing extra separation of extraction fluids.

The properties of the extraction fluid may simply be adapted to the operational pressure and temperature of existing water treatment plant based upon hydrocyclones, since changes in pressure and temperature of the produced water partly involve strong distortion of the separation.

The extraction as such may be performed in the pipeline system or the volume upstream of the hydrocyclone used for removal of free oil, implying a minimum of additional equipment and modifications.

The application of known extraction processes results in the need of additional equipment in order to obtain contact between the extraction fluid and produced water. Normally it may also be expected that hydrocarbons from the production plant should be in equilibrium with the produced water, and hence cannot be used for extraction of the very same components.

In addition to the area of contact, viscosity and diffusibility, together with the content of the components to be extracted, are the properties having greatest effect on separation of dissolved components. Use of slightly heavier fractions is desirable, since it then is possible to adapt the pressure and the temperature of the extraction fluid to operational conditions of the separation process rather than the contrary.

The modifications required in order to achieve increased cleaning effect according to the present invention is of limited extent. Existing water processing equipment may readily be used, with small modifications. The forming of the modifications is of substantial importance in order to achieve the intended cleaning effect. This will be described in further details below:

The forming and manner of operation of the extraction process itself

Substantial changes in relation to a water cleaning system for free oil in water Choice and treatment of condensate fraction Theory for the extraction process.

It is established calculations for an existing oil field, showing that it is possible to achieve a distinct purifying effect. It is also performed laboratory tests, showing that the described extraction functions in practice.

BRIEF DESCRIPTION OF THE DRAWINGS

The invention will be described in more details below, referring to the accompanying drawings, illustrating the invention by means of examples.

DETAILED DESCRIPTION OF THE EXEMPLARY EMBODIMENTS

Figure 1:
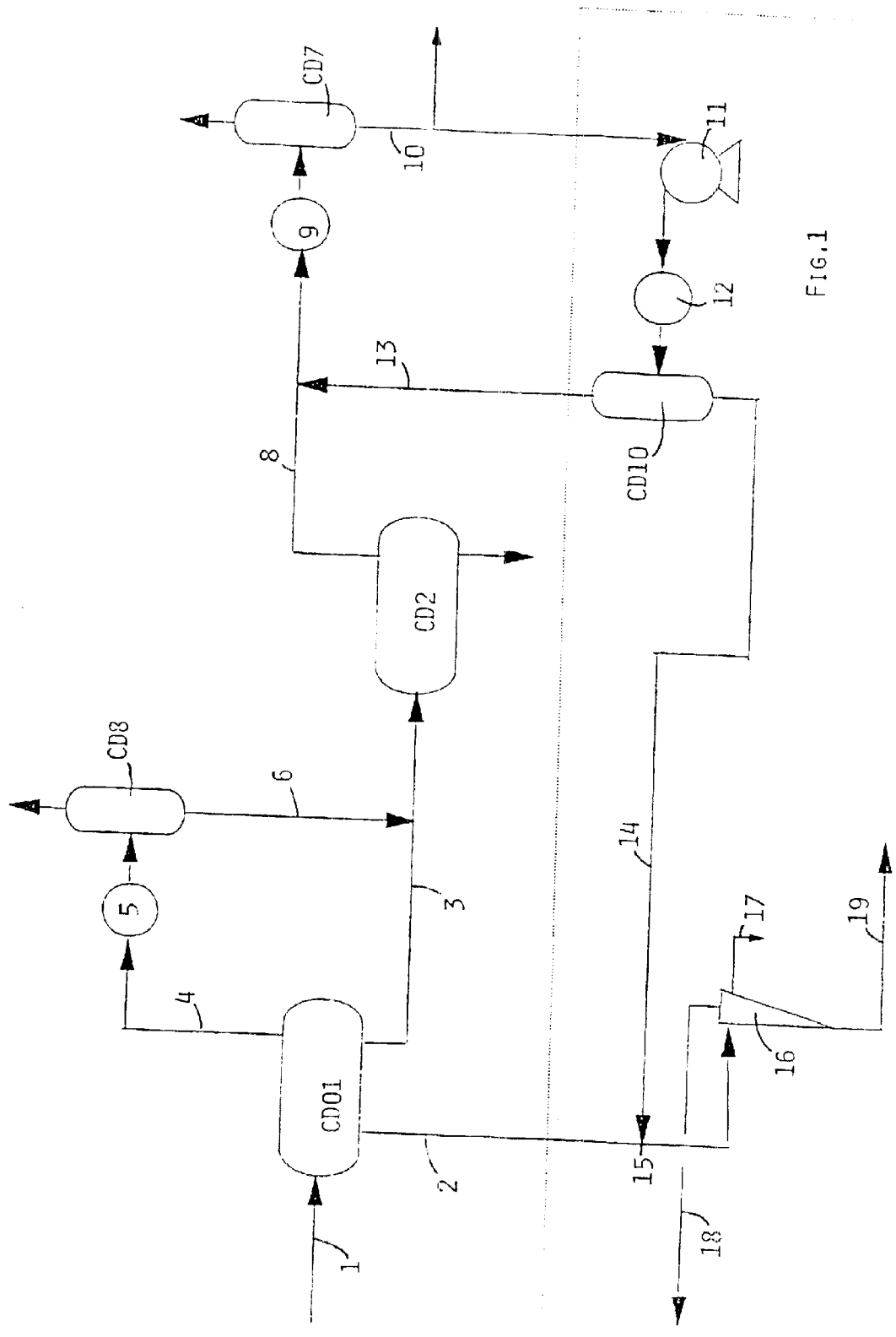
FIG. 1 illustrates schematically the extraction process.

The extraction process is shown on FIG. 1. The Figure is made based on an existing production plant for oil and associated gas on the Norwegian Continental shelf. Here, the oil contaminated water 2 is separated from oil 3 and gas 4 in a well stream 1 at the inlet separator CD01. Further, water containing oil is separated out in a second stage separator, CD2, processed in a separate hydrocyclone unit. A typical oil content in the water from such separator is 300–2000 ppm. This oil is separated by means of hydrocyclones, till about 20–40 ppm, as shown on the Figure.

In FIG. 1 water fractions 3 are conducted from the first separator 1 to a second separator where the first fluid fraction is further separated into a second liquid and gas fraction 7, 8. Here, the liquid fraction 7 will consist of heavier hydrocarbons, which for example may be conducted into a process plant, while the lighter hydrocarbons in the gas fraction 8 are conducted through a cooler 9 and into a further separator CD7.

The produced water 2 which escapes out of the separator CD01 will at present let all the dissolved substances escape out with the water, including naphtas, polyaromatic hydrocarbons, benzene, toluene and xylene (BTX). Extraction of these components is achieved by means of the extraction process indicated within the dotted line.

The fluid fraction 10 is drawn from a fluid separator CD7, as shown on FIG. 1 and the required amount is returned to the water flow. Selection of an suitable fluid fraction 10 is important, as described below. Components included in the improved water treatment system according to the invention is shown inside the dotted line while the remaining components 1-CD7 may be included in an existing process plant. The pressure of the water fraction may in practice be higher than for the water flow to be treated. An extra pressure surcharge of 5 bar or more is required in order to disperse condensate in the water flow. Liquid fraction 10 from the third separator CD7 in FIG. 1 is therefore directed through a pump 11.

By regulating the separators CD01, CD2 and CD7 a condensate 10, 14 may be obtained, comprising a relatively low fraction of the water solubles to be removed from the water fraction 2. This condensate 10, 14 may consequently be mixed with the water fraction 2 for mass transfer of these components from the water flow to the condensate, so that the remaining water 19 has a reduced content of the water soluble hydrocarbons.

The water stream 2 is normally warmer than the condensate 14, and one cannot allow the condensate to evaporate subsequent to the mixing. In this case the condensate is heated up in a heat exchanger 12 to the temperature required to avoid evaporation when mixed with the water flow. Excess of gas is separated in a fourth separator CD10, where after the fluid fraction is mixed into the water phase 2, in the pipeline system 15 upstream of the water purifying hydrocyclone 16.

Extraction of the dissolved components from the water phase will mainly happen in the pipeline system, which will have a substantially longer time of retention for liquid than the hydrocyclone. The principal function of the water purifying hydrocyclone 16 will thus be to separate free hydrocarbons 17 from the water phase 2.

The pressure of the condensate 14 may be adjusted to the pressure at which the hydrocyclone 16 operates, by means of a valve or a pump, depending of the pressure at which the water fraction is taken out. The temperature of the liquid fraction should be adjusted by means of a heat exchanger, otherwise free gas may be formed when mixed with the produced water. Excess of gas will then have to be separated within a separate separator. Both these modifications may be achieved by means of the referenced pump 11, separator CD10 and the heat exchanger 12. If gas is not formed when the condensate 10, 14 is mixed with the water phase, then it is unnecessary to install heat exchanger and separator.

In the embodiment shown on FIG. 1, CD01 is a three phase separator which separates oil, water and gas as separate phases. As an alternative fluid separator the Figure also show the use of a gas scrubber CD8 which also separates out a liquid fraction which may be considered used as an extraction medium.

Mixing of the extraction medium 14 with the water phase 2 is of major importance to make the system function efficiently. A series of modifications are required in order to enable the extraction process to function as an optimum:

1. Mixing should preferably take place in the pipe line system upstream of the hydrocyclone 16 in order to achieve an increased time of contact between the phases. A time of retention upstream of the hydrocyclone of 1–2 seconds or more is preferably, but not always required. Preferably, the time is more than 0.3 seconds. Recent tests have in addition shown that in a certain number of cases the time of retention of 3–5 seconds may be favourable.
2. The extraction medium/condensate 14 may be finely dispersed in the water phase. This may be achieved in any known manner by the use of injection nozzles, at an operational pressure sufficient to produce a fine dispersion.
3. It is important that the extraction fluid 14 is dispersed over a substantial part of the cross sectional area of the flow. This may be achieved by design of the nozzle means. A static mixer may be installed downstream of the point of injections in order to distribute the condensate droplets in the entire water phase. In order to ensure that the liquid fraction is not separated out to early, it is important that the water fraction is sufficiently finely dispersed and that the time of retention upstream of the hydrocyclone is not becoming too long. The function of the hydrocyclone may be affected by inclusion of a liquid fraction. The following assessment or modifications of the hydrocyclone is required:
4. The hydrocarbon reject 18 must be dimensioned for addition of the condensate 14. This may normally be achieved in accordance with the suppliers dimensioning of the hydrocyclone 16.
5. The liquid fraction may start to be separated from the water phase upstream of the hydrocyclone. In particular, on horizontally arranged cyclones an uneven distribution of the liquid fraction into the hydrocyclone may occur, dependent upon the design. Several solutions may here be considered: Hydrocyclones may be installed vertically, and/or may drain away excess 17 of condensate.
6. Alternative design of the inlet of the hydrocyclone assembly, e.g. by installing a static mixer just upstream of the hydrocyclone, may be considered.
7. If tendencies for stable emulsions to form in the oil polluted water is experienced, the introduction/fine distribution of the liquid fraction may increase the content of free hydrocarbons passing through the hydrocyclone.
8. If stable emulsions are not experienced, a hydrocyclone may work better. This is an uncertain area, since the amount of fine droplets which in any case is passing through the cyclone, not necessary will be influenced.

The invention is best suited to be arranged upstream of separation equipment for oil containing water at a pressure close to the operation pressure for upstream three phase separator. By adopting the properties of the water fraction to operation pressure for adequate separation equipment, one can also expect corresponding extraction also in other types of water treatment system, e.g. flotation.

A filter coalescer will in certain cases be applied as separator at high pressure, as an alternative to a hydrocyclone, e.g. if problems with stable emulsions are experienced.

The invention is also suitable for other types of processes, where aromatics are extracted by application of hydrocarbons. This applies for instant to counter flow or parallel flow liquid/liquid extraction processes.

Hydrocarbon reject and excessive condensate may be reintroduced into the process plant, e.g. in front of the second or the third separator CD2, CD7, in order to purify the water soluble hydrocarbons and for reintroduction into the system.

The process is suitable for extracting fat dissolvent chemicals from produced water. This is due to the fact that fat dissolvent chemicals also will be dissolved and extracted in a condensate fraction. Some of the bio accumulative compounds are characterised in that they are fat dissolvable and for this purpose, the described extraction process is well suited.

Choice and Treatment of Condensate Fraction

The choice of liquid fractions of essential importance in order to make the extraction process function. Condensate fractions from a production plant are often suitable since they contain a small amount of PAH and NPD and moderate amounts of BTX. Separation occurs normally for compression and drying equipment at 30–40° C., and pressure of 5–45 bar. Condensate which is separated out at a higher pressure has a tendency to evaporate when coming into contact with hot produced water. There is certain characteristics which have to be satisfied for a suitable liquid fraction:

1. Concentration of the extracted components (PAH, NPD, BTX) must be substantially lower in the liquid fraction, than in hydrocarbon liquid phase which originally was in contact with produced water.
2. The liquid fraction must be able to exist in liquid form at separation pressure in the hydrocyclone.
3. A sufficient quantity of liquid fraction has to be available.

More specifically the condensate 10, 14 to be injected into the water flood should have a mole weight of 50–100 and a bubble point pressure at the hydrocarbon/water mixture which is lower than the operational pressure in the separator and where the content of the oil soluble components is lower than 50% of the equilibrium concentration with the components in the liquid phase.

BTX is substantially more volatile components than PAH. A liquid fraction is separated out in a gas processing plant which may contain sufficient BTX to avoid separation of substantial extra volume at contact with produced water.

Figure 2:
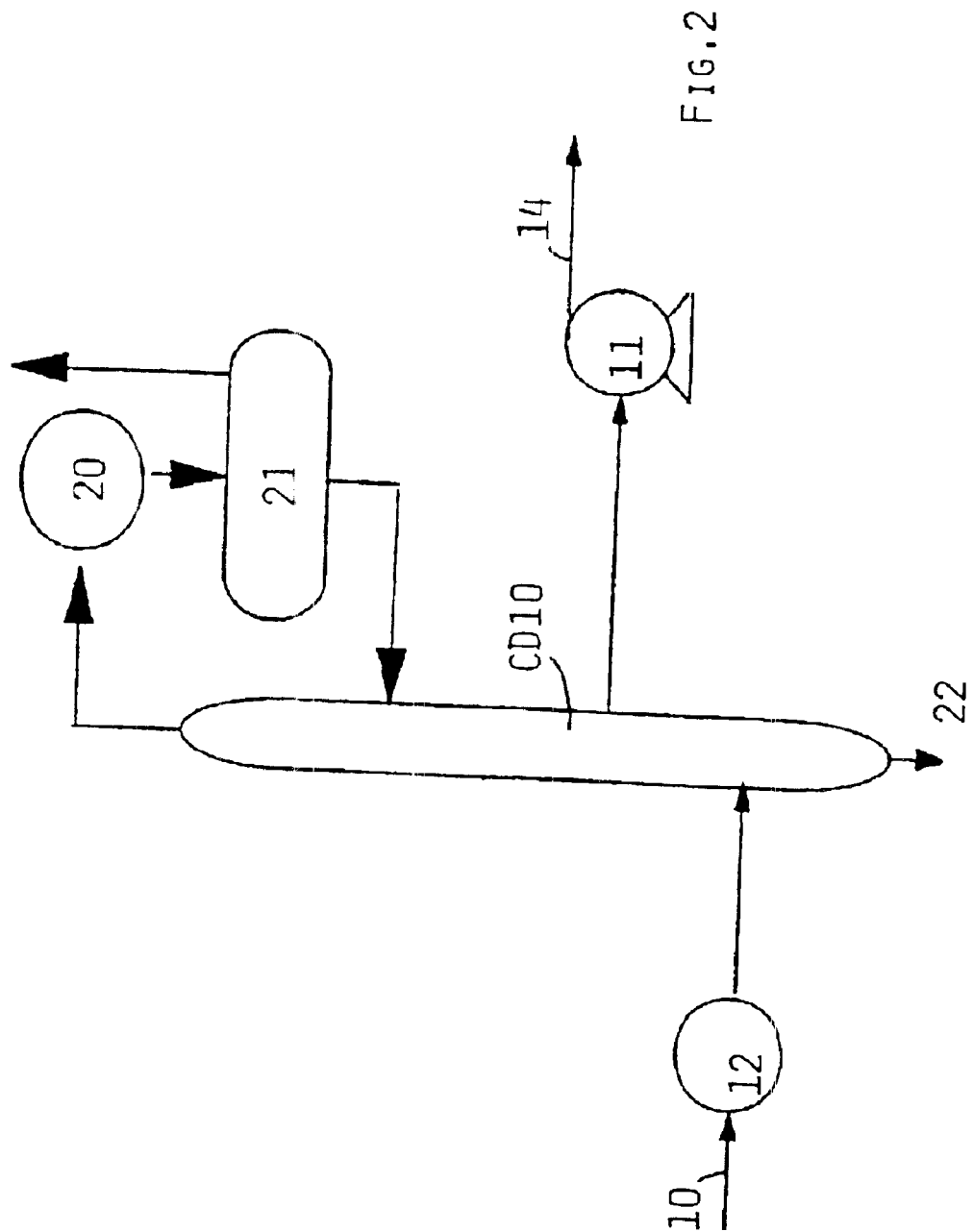
FIG. 2 illustrates schematically one separator for production of the extraction medium.

In FIG. 2 the fourth separator CD10 shown as a known rectificator, which provides possibilities to take out a liquid fraction with a very low BTX and PAH content. The liquid fraction fades in a step. Light components will be stripped off at the top of the column, preferably methane and ethane. The light components are cooled and separated in a condenser 20, or a separator 21 respectively, where the liquid fraction from the separator 21 is transferred back to the column. The residual product in the column will contain less volatile components which may be drained off at the bottom level 22, while one at suitable level in the column will find a suitable concentration of lighter components which is transferred to the pump 11.

In certain production plants a stripper or a fractionation means is available, and a suitable liquid fraction may then be drawn off directly from the process equipment.

There exists a number of different types of unit operations which is suitable for removing PAH and/or BTX from a condensate fraction, such as stripping, fractionating, rectification, adsorption and absorption.

There exists often more than one single liquid fraction in a production plant, and one may then produce the most suitable liquid fraction by mixing the fractions for adjusting the pressure, temperature and the compound. The purpose of mixing may be that one obtains one or more of the criteria 1–3 without further processing.

Theory

Water from a production plant for oil and gas has generally a temperature of 50–100° C. Light liquid fractions consisting of hydrocarbons will at such high temperature provide good mass transfer with the water phase. It is mainly viscosity and diffusibility which affects the mass transfer.

Low viscosity and high diffusibility reduces the required time of contact between the liquid phases. By sufficient area of contact between the liquid phases, the required time of contact will be very short. Tests which has been performed, show that it is possible to achieve good separation of dissolved components in a common hydrocyclone plant.

Diffusibility may be increased radically if one operates close to the critical point for the hydrocarbon phase. There exists no basis for supercritical conditions being required in order to succeed with this type of extraction process. Supercritical conditions of the hydrocarbon phase provide reduced requirements to area of contact and time of contact between the phases.

The most important critical factor is the exit concentration of the extracted components (BTX, NPD, PAH and/or chemicals) in the liquid fractions, used as extraction medium. FIG. 1 shows a three phase separator CD01 which separates out oil, water and gas as separate phases.

Table 1 shows concentration of xylene and a more heavy aromatics in the oil phase from three phase separator CD01, in a liquid fraction from an oil scrubber CD8 and in a liquid fraction which is taken out from a liquid separator in the recompression system, respectively. Condensate from two other scrubbers CD5, CD6 (not shown) in the plant are also included for the purpose of comparison.

TABLE 1

Mole fraction of aromatics in liquid fractions in process plant, oil field

| Parameter | CD01 | CD8 | CD7 | CD6 | CD5 |
|---|---|---|---|---|---|
| BTX | 0.0108 | 0.0045 | 0.0040 | 0.0070 | 0.0313 |
| NPD | 0.00863 | 0.00028 | 0.00023 | 0.00037 | 0.00071 |
| PAH | 0.00034 | 0.000009 | 0.000007 | 0.00012 | 0.000071 |
| Volume, m³/h | 947 | 35 | 46 | 35 | 0.58 |
| Pressure, bar | 68.7 | 64.5 | 22.6 | 5.4 | 1.1 |
| Temp., ° C. | 82 | 35 | 36 | 28 | 35 |
| % degassing | — | 14 | 0 | 0 | 0 |

If the liquid shall be used as extraction medium the concentration of the aromatics must be substantially lower than in the oil phase from which produced water is separated from. It can be seen that CD7 generally has the lowest concentration of all the groups of aromatics. CD8 has nearly as good concentration, but produces degassing. This means that such condensate must be heated up and gas is separated for injection. This is fully possible, but results in a more expensive solution.

TABLE 2

Theoretical obtainable separation at equilibrium, CD7 - condensate.

| Parameter | Water, prior to | Water, subseq. to | Condensate | Deg. Of cleaning % |
|---|---|---|---|---|
| BTX, kg/h | 0.9319 | 0.3488 | 7.2 | 62.6 |
| NPD, kg/h | 0.6252 | 0.0192 | 81.7 | 96.9 |
| PAH, Kg/h | 0.0352 | 0.0009 | 0.26 | 97.3 |
| Volume, m³/h | 1331 | 1331 | 19 | |

The table shows maximum degree of cleaning if equilibrium is achieved. It is achieved a degree of cleaning of 80–90% for PAH in laboratory. Substantially lower degree of cleaning is achieved for BTX since the starting level for BTX in condensate phase is too high. If condensate from CD6 is used, the degree of cleaning for BTX will decrease to 35.5%.

In this specific case it can in fact be seen that condensate from CD7 and CD8 are the ones which best satisfies the criteria of selection. Condensate from CD5 and CD6 is not suitable, since separation of BTX is too low. The volume of condensate from CD5 is also too low to perform a satisfactory separation.

The calculations are by no means optimum. In practice, the volume of condensate may be lowered substantially without reducing the results substantially. The real degree of separation will be below the calculated values, since a full equilibrium is not achieved. In order to achieve separation close to equilibrium, the defined criteria should be met. Poor dispersion and/or distribution of condensate gives prolonged time of retention in order to achieve equilibrium.

If is desired to further improve the degree of separation of BTX, it is necessary to perform fractionating or rectification of the flow of condensate.

Results from research show that produced water contains large amounts of droplets of oil/condensate. A substantial part of the dispersed hydrocarbons may have a characteristic droplet size of 10 microns or less. Hydrocyclones used in hydrocyclone plants shall according to suppliers specification not be able to remove so small droplets. A limit of approximately 20 microns for the range of use is commonly set.

In order to explain such excellent separation of oil from water, it must be assumed that a substantial part of the smaller droplets also is removed in those hydrocyclones which are used. The cause is assumed to be flotation effects: Dissolved gas is released due to pressure reduction through the hydrocyclone. Normally the amount of gas, which is dissolved in water, is sufficient, but it can be considered that addition of some gas may further increase the effect of flotation. This solution may of course be combined with the solution according to this invention.

On this basis it is not considered that addition of a lighter hydrocarbon fraction normally will have a substantial effect on the water cleaning in real hydrocyclone plant. One will not necessarily break emulsions by addition of a lighter fraction. The environmental gain by reducing free oil in water below present level, which in certain places already is as good as 15 ppm, is also uncertain.

What is claimed is:

1. Method for extraction of fat or oil soluble components from produced water which is separated from an oil and/or gas plant, comprising:

separating hydrocarbons from the oil and/or gas plant and using the separated hydrocarbons as an injection liquid which has a lower content of the fat or oil soluble components than is in contained in the produced water, adjusting a temperature of the injection liquid with respect to a temperature of the produced water and adjusting the bubble point pressure with respect to a pressure of the produced water separated from the oil and/or gas plant, into which the injection liquid is to be injected, injecting the injection liquid into the produced water and atomizing the injection liquid in the produced water so that the produced water is exposed to the atomized injected injection liquid for a time sufficient to allow mass transfer of the fat or oil soluble components from the produced water to the injection liquid, and separating the injection liquid from the produced water in a separator.

2. Method according to claim 1, characterized in that the injection liquid is finely distributed by injection through a nozzle, and/or distributed in the produced water by a mixer in order to maximize the area of contact between the produced water and the injection liquid and consequently mass transfer of the dissolved components in the produced water to the injection liquid.

3. System according to claim 2, wherein the mixer is a static mixer.

4. Method according to claim 1, characterized in that the sufficient time of exposure of the produced water to the injection liquid is achieved with the produced water flowing at a predetermined rate in the pipeline system between a point of injection and the separator, and by placing the point of injection at a predetermined distance upstream from the separator.

5. Method according to claim 1, characterized in that the time of exposure from the injection of the injection liquid until separation of the injection liquid from the produced water, is greater than 0.3 sec.

6. Method according to claim 1, characterized in that the produced water is separated from an oil flow in a production plant for oil and/or gas, and that the injection liquid consists of a condensate which is extracted from the oil/gas process in the production plant.

7. Method according to claim 1, characterized in that the injection liquid has a mole weight of 50–100, has a bubble point pressure at the temperature of a mixture of the injection liquid and the produced water, which is lower than an operation pressure of the separator, and where a content of the fat or oil soluble components is less than 50% of an equilibrium concentration of the fat or oil soluble components contained in the produced water.

8. Method according to claim 1, characterized by using a filter coalescer as the separator during operation wherein the pressure of the produced water containing atomized injection liquid, is above atmospheric pressure.

9. System according to claim 1, characterized in that the components comprise at least one of benzene, toluene and xylene (BTX), naphthalene, phenantrene (NPD), and polyaromatic hydrocarbons (PAH).

10. System according to claim 1, characterized in that the separator comprises a hydrocyclone.

11. Method according to claim 1, wherein a portion of the injection liquid is recirculated in order to achieve a higher grade of mass transfer and utilisation of the injection liquid and/or a portion of the injection liquid is regenerated.

12. System for cleaning produced water comprising:

an oil/gas plant, a conduit for containing a flow of produced water from the oil/gas plant, one or more separator for preparation of an injection liquid comprising hydrocarbons flowing from the oil/gas plant, the injection liquid having a lower content of fat soluble components than an equilibrium concentration of the fat soluble components in the produced water, adjusting means connected to the separator(s) for adjusting a temperature of the injection liquid with respect to a temperature of the produced water and adjusting a bubble point pressure of the injection liquid with respect to a pressure of the produced water, means for injection connected to means for injection and distribution of the injection liquid in the flow of produced water, a pipeline or chamber, which retains a mixture of the injection liquid and the produced water so that the injection liquid is maintained dispersed in the produced water for a predetermined mixture retention time, and a further separator connected to the pipeline or chamber for separation of the injection liquid from the produced water.

13. System according to claim 12, characterized in that the means for injection comprises one of a nozzle and a static mixer for dispersion of the injection liquid in the extracted water in order to maximize an area of contact between the produced water and the injection liquid and hence obtain mass transfer of dissolved components in the produced water to the injection liquid.

14. System according to claim 13, characterized in that the means for injection is arranged in the water flow upstream of and at a predecided distance from the further separator in order to achieve the predetermined mixture retention time.

15. System according to claim 14, characterized in that the predetermined distance is chosen such that the injection liquid remains mix with the produced water for a time from when the injection liquid is injected until the injection liquid is extracted from the extracted water, and wherein the time is longer than 0.3 sec.

16. System according to claim 12, characterized in that the injection liquid comprises condensate extracted from the oil/gas plant.

17. System according to claim 12, characterized in that the liquid has a mole weight of 50–100, has a bubble point pressure at the temperature of the mixture, which is lower than an operation pressure in the further separator and where a content of the fat soluble components is lower than 50% of the equilibrium concentration of the fat soluble components in the produced water.

18. System according to claim 12, characterized in that the further separator comprises a filter coalescer and wherein the pressure of the produced water having the injection liquid distributed therein, exceeds atmospheric pressures.

19. System according to claim 12, characterized in that the further separator is a hydrocyclone.

20. System according to claim 12, characterized in that the components comprise at least one of benzene, toluene and xylene (BTX), naphthalene, phenantrene (NPD), and polyaromatic hydrocarbons (PAH).

21. System according to claim 12, wherein a portion of the injection liquid is recirculated in order to obtain a higher degree of mass transfer and utilisation of the injection liquid and/or a portion of the injection liquid is regenerated.

* * * * *